(12) United States Patent
Bhattacharyya et al.

(10) Patent No.: US 11,766,670 B2
(45) Date of Patent: Sep. 26, 2023

(54) ALKALINE ANION EXCHANGE MEMBRANES AND METHODS OF USE THEREOF

(71) Applicant: 1s1 Energy, Inc., Portola Valley, CA (US)

(72) Inventors: Sukanta Bhattacharyya, Belmont, CA (US); Daniel Sobek, Portola Valley, CA (US)

(73) Assignee: 1s1 Energy, Inc., Portola Valley, CA (US)

( * ) Notice: Subject to any disclaimer, the term of this patent is extended or adjusted under 35 U.S.C. 154(b) by 0 days.

(21) Appl. No.: 17/869,646

(22) Filed: Jul. 20, 2022

(65) Prior Publication Data

US 2022/0370998 A1    Nov. 24, 2022

Related U.S. Application Data

(63) Continuation of application No. PCT/US2021/014398, filed on Jan. 21, 2021.

(60) Provisional application No. 62/963,914, filed on Jan. 21, 2020.

(51) Int. Cl.
| | |
|---|---|
| *B01J 41/10* | (2006.01) |
| *C08F 112/14* | (2006.01) |
| *C25B 9/23* | (2021.01) |
| *C25B 13/05* | (2021.01) |
| *C08F 8/42* | (2006.01) |
| *C08G 8/10* | (2006.01) |
| *C08G 8/28* | (2006.01) |
| *C25B 13/02* | (2006.01) |
| *H01M 4/86* | (2006.01) |

(Continued)

(52) U.S. Cl.
CPC .............. *B01J 41/10* (2013.01); *C08F 8/42* (2013.01); *C08F 112/28* (2020.02); *C08G 8/10* (2013.01); *C08G 8/28* (2013.01); *C25B 9/23* (2021.01); *C25B 13/02* (2013.01); *C25B 13/05* (2021.01); *H01M 4/8663* (2013.01); *H01M 8/1016* (2013.01); *H01M 8/1018* (2013.01)

(58) Field of Classification Search
CPC .......... C08G 8/28; B01J 41/10; B01D 69/106; B01D 69/107; B01D 69/108; B01D 69/10; H01M 4/86; H01M 4/88; H01M 4/90
See application file for complete search history.

(56) References Cited

U.S. PATENT DOCUMENTS

| | | |
|---|---|---|
| 2008/0050630 A1 | 2/2008 | Bert |
| 2013/0313118 A1 | 11/2013 | Lin |
| 2015/0125729 A1 | 5/2015 | Lee |

(Continued)

FOREIGN PATENT DOCUMENTS

| | | | | |
|---|---|---|---|---|
| WO | WO-2014025443 A2 | * | 2/2014 | .......... H01M 16/003 |

OTHER PUBLICATIONS

"International Search Report and Written Opinion received in International Application No. PCT/US2021/014398 dated Apr. 7, 2021."

*Primary Examiner* — Walter D. Griffin
*Assistant Examiner* — Cameron J Allen
(74) *Attorney, Agent, or Firm* — ALG Intellectual Property, LLC

(57) ABSTRACT

An anion exchange membrane includes a porous structural framework and bismuth atoms bonded to pore surfaces of the porous structural framework. Each bismuth atom is bonded to a pore surface by way of one or two oxygen atoms.

30 Claims, 14 Drawing Sheets

(51) Int. Cl.
*H01M 8/1016* (2016.01)
*H01M 8/1018* (2016.01)

(56) References Cited

U.S. PATENT DOCUMENTS

2016/0149228 A1 5/2016 Chao
2017/0252707 A1 9/2017 Bahar
2017/0320053 A1 11/2017 Moon

* cited by examiner

ALKALINE ANION EXCHANGE MEMBRANES AND METHODS OF USE THEREOF

RELATED APPLICATIONS

The present application is a continuation of International Patent Application No. PCT/US2021/014398, filed on Jan. 21, 2021, which claims priority to U.S. Provisional Patent Application No. 62/963,914, filed on Jan. 21, 2020, the contents of which are hereby incorporated by reference in their entireties.

BACKGROUND INFORMATION

Anion exchange membranes (AEMs) are semipermeable membranes that are engineered to transport anions while being impermeable to gases. Alkaline anion exchange membranes (AAEMs) are AEMs containing alkaline anions such as hydroxide ($OH^-$), carbonate ($CO_3^{2-}$), and bicarbonate ($HCO_3-$). AEMs and AAEMs may be used in fuel cells, electrolyzers, redox flow batteries, reverse electrodialysis cells, and microbial fuel cells, among other applications.

SUMMARY

The following description presents a simplified summary of one or more aspects of the apparatuses, compositions, methods, and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the apparatuses, compositions, methods, and systems described herein in a simplified form as a prelude to the more detailed description that is presented below.

In some illustrative embodiments, an anion exchange membrane comprises a porous structural framework and bismuth atoms bonded to pore surfaces of the porous structural framework, wherein each bismuth atom is bonded to a pore surface by way of one or two oxygen atoms.

In some illustrative embodiments, each bismuth atom is further bonded to a hydroxyl group or a hydroxide anion.

In some illustrative embodiments, each bismuth atom and the one or to oxygen atoms are included in a bismuth subsalicylate group linked to the pore surface.

In some illustrative embodiments, each bismuth subsalicylate group is linked to the pore surface by way of a bromo group, a chloro group, an iodo group, a thiol group, a hydroxyl group, an amino group, or a carboxyl group.

In some illustrative embodiments, each bismuth subsalicylate group is further linked to the pore surface by way of an alkyl spacer chain of length n, where n ranges from 1 to 20.

In some illustrative embodiments, each bismuth atom and the one or two oxygen atoms are included in a bis-bismuth subsalicylate group linked to the pore surface.

In some illustrative embodiments, the bis-bismuth subsalicylate group is linked to the pore surface by way of a bismuth-oxygen bond.

In some illustrative embodiments, the porous structural framework comprises glass.

In some illustrative embodiments, the porous structural framework comprises a formaldehyde resin.

In some illustrative embodiments, the formaldehyde resin comprises a phenol-formaldehyde resin, a salicylic-phenol-formaldehyde resin, or a salicylic acid-formaldehyde resin.

In some illustrative embodiments, the porous structural framework comprises a diethanolamine-functionalized polystyrene resin.

In some illustrative embodiments, the porous structural framework comprises chitin, chitosan, or cellulose.

In some illustrative embodiments, a method of making an anion exchange membrane comprises bonding bismuth atoms to pore surfaces of a porous structural framework by way of one or two oxygen atoms.

In some illustrative embodiments, the bonding comprises reacting bismuth hydroxide with hydroxyl groups present at the pore surfaces.

In some illustrative embodiments, the method further comprises functionalizing the pore surfaces with the hydroxyl groups.

In some illustrative embodiments, the functionalizing the pore surfaces with the hydroxyl groups comprises reacting functional salicylic acid with hydroxyl groups of the porous structural framework by way of a bromo group, a chloro group, an iodo group, a thiol group, a hydroxyl group, an amino group, or a carboxyl group.

In some illustrative embodiments, the functional salicylic acid further comprises an alkyl spacer chain of length n, where n ranges from 1 to 20.

In some illustrative embodiments, the functionalizing the pore surfaces with the hydroxyl groups comprises reacting bismuth hydroxide with hydroxyl groups of the porous structural framework to form two bismuth-linked hydroxyl groups and reacting bis-salicylic acid with the two bismuth-linked hydroxides.

In some illustrative embodiments, the porous structural framework comprises a formaldehyde resin with pendant hydroxyl groups at the pore surfaces.

In some illustrative embodiments, the formaldehyde resin comprises a phenol-formaldehyde resin, a salicylic-phenol-formaldehyde resin, or a salicylic acid-formaldehyde resin.

In some illustrative embodiments, the porous structural framework comprises a diethanolamine-functionalized polystyrene resin with pendant hydroxyl groups at the pore surfaces.

In some illustrative embodiments, the porous structural framework comprises chitin, chitosan, or cellulose with pendant hydroxyl groups at the pore surfaces.

In some illustrative embodiments, an apparatus comprises an anode, a cathode, and an alkaline anion exchange membrane positioned between the cathode and the anode, the anion exchange membrane comprising a porous structural framework and a bismuth atom bonded to a pore surface of the porous structural framework by way of one or two oxygen atoms.

In some illustrative embodiments, the anode comprises a first catalyst layer coated on a first side of the alkaline anion exchange membrane, and the cathode comprises a second catalyst layer coated on a second side of the alkaline anion exchange membrane.

In some illustrative embodiments, the first catalyst layer and the second catalyst layer each comprise an ionomer containing bismuth and embedded catalysts.

In some illustrative embodiments, the apparatus further comprises a first porous transport layer and a first bipolar plate positioned on the first side of the alkaline anion exchange membrane, and a second porous transport layer and a second bipolar plate positioned on the second side of the alkaline anion exchange membrane.

In some illustrative embodiments, the pore surface of the porous structural framework is functionalized with a bismuth subsalicylate derivative including the bismuth atom, the one or two oxygen atoms, and a pendant hydroxide group linked to the bismuth atom.

In some illustrative embodiments, the bismuth subsalicylate derivative comprises functional bismuth subsalicylate or bis-bismuth subsalicylate.

In some illustrative embodiments, the pore surface of the porous structural framework is functionalized with bismuth hydroxide.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements. Furthermore, the figures are not necessarily drawn to scale as one or more elements shown in the figures may be enlarged or resized to facilitate recognition and discussion.

DETAILED DESCRIPTION

Alkaline anion exchange membranes (AAEMs), and methods of making and using AAEMs, are described herein. In some examples, an illustrative alkaline anion exchange membrane includes a porous structural framework and bismuth atoms bonded to pore surfaces of the porous structural framework. The bismuth atoms are bonded to the pore surfaces by way of one or two oxygen atoms. Anion exchange is provided by hydroxide anions linked to the bismuth atoms. The presence of the oxygen-bismuth bond increases the hydrophilicity of the porous structural framework.

The AAEMs described herein have high mechanical strength, high anion conductivity, low electron conductivity, chemical stability under alkaline conditions, durability, and low cost of production. Moreover, some embodiments of the AAEMs do not incorporate toxic materials.

The apparatuses, compositions, methods, and systems described herein may provide one or more of the benefits mentioned above and/or various additional and/or alternative benefits that will be made apparent herein. Various embodiments will now be described in more detail with reference to the figures. It will be understood that the following embodiments are merely illustrative and are not limiting, as various modifications may be made within the scope of the present disclosure.

Figure 1:
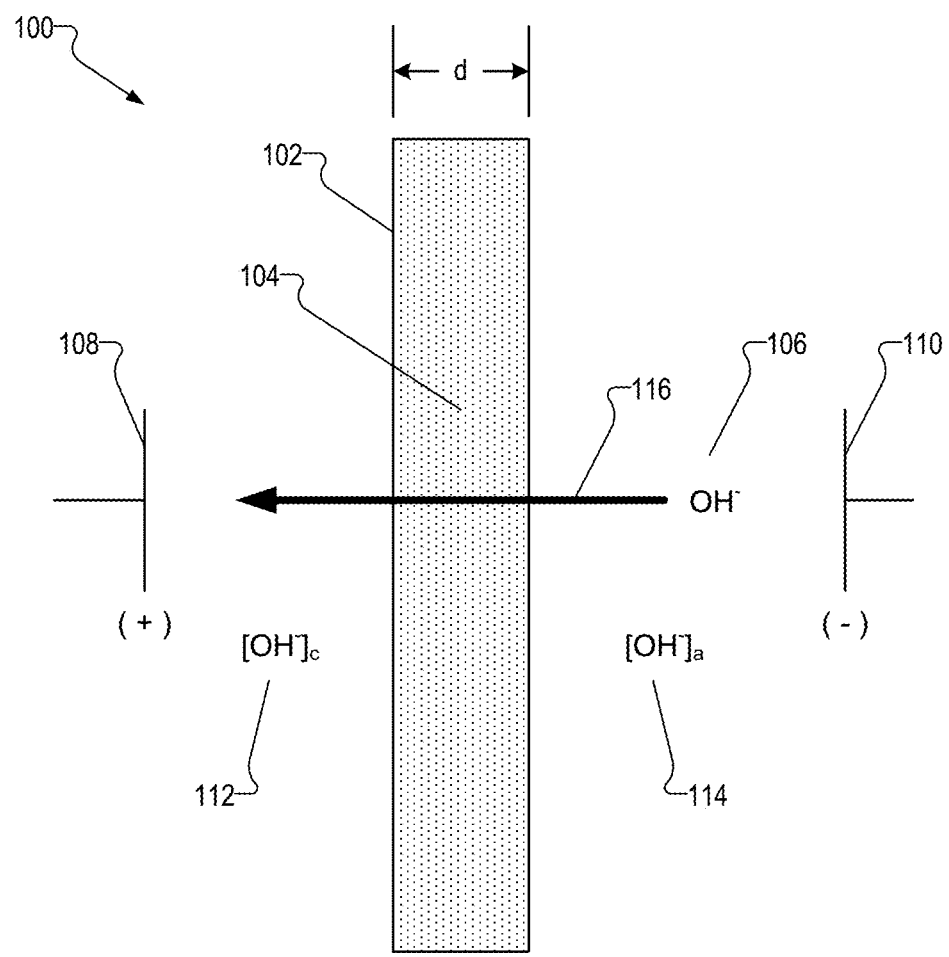
FIG. 1 shows a schematic diagram of an illustrative AAEM.

FIG. 1 shows a schematic diagram of an illustrative alkaline anion exchange membrane 100 (AAEM 100). AAEM 100 includes a porous structural framework 102 with bismuth atoms 104 distributed throughout the porous structural framework 102. A portion or most of the bismuth atoms 104 are arranged at pore surfaces (not shown in FIG. 1) inside in AAEM 100.

AAEM 100 is designed to conduct anions such as a hydroxide anion 106 ($OH^-$) while being impermeable to gases such as hydrogen ($H_2$) or oxygen ($O_2$). The transport of anions through AAEM 100 may be driven by an electric field established by a potential difference between a positive electrode 108 and a negative electrode 110 or by an anion concentration gradient between the two sides of AAEM 100. In the example shown in FIG. 1, the anion concentration gradient is established by the difference between a cathode-side hydroxide anion concentration $[OH^-]_c$ 112 and an anode-side hydroxide anion concentration $[OH^-]_a$ 114. In the example shown in FIG. 1, the anode-side hydroxide anion concentration $[OH^-]_a$ 114 is assumed to be much larger than the cathode-side hydroxide anion concentration $[OH^-]_c$ 112 at any given time such that both migration and diffusion transport are in the direction shown by arrow 116. In this example, it is also assumed that there is an electrochemical source of hydroxide anions 106 at the anode 110.

AAEM 100 may have a thickness d less than approximately 0.5 millimeters (mm). Alternatively, AAEM 100 may have any other thickness as may suit a particular implementation. The porous structural framework 102 in AAEM 100 may be provided by an inorganic amorphous material, an inorganic crystalline material, or by a polymer matrix. The polymer matrix may be a natural polymer, a synthetic polymer, or a mixture of both. Regardless of the material that is used to form the porous structural framework 102, its porosity may be generated in various forms depending on the material or by grinding up the material and binding it back together into a frit.

In some examples, the porous structural framework 102 comprises glass. Glass may have three primary components: a major component (e.g., silica) that forms the network, fluxes such as potash to lower the melting point of the glass, and additives such as lime, boric acid, bismuth oxide, or lead oxide to adjust the physical and optical properties of the glass. Other suitable inorganic amorphous materials that may be used for porous structural framework 102 may include, without limitation, alumina, ceramics, silica, mesoporous silica, titanium dioxide, zeolites, and zirconia.

As mentioned, bismuth atoms 104 are arranged at pore surfaces of porous structural framework 102. Bismuth is mostly a trivalent element with a substantial metallic (electropositive) character. It is the most electropositive element among the Group 15 elements in the Periodic Table and thus has the most metallic character among the Group 15 elements. Bismuth is also the least toxic of the heavy metals. Bismuth is an oxophilic element that can form various oxygenated species via both covalent and ionic linkages. Bismuth is abundant in nature and typically found in oxide and sulfide ores. Bismuth(III) oxide may provide a source for bismuth atoms 104 in AAEM 100. In the presence of water, bismuth(III) oxide may be hydrated to bismuth hydroxide ($Bi(OH)_3$), as shown by the following Equation (I):

$$Bi_2O_3 + 3H_2O \rightarrow 2Bi(OH)_3 \quad (I)$$

As shown below in Equations (II) and (III), when in the presence of water at least one of the hydroxyl groups of bismuth hydroxide is in a dynamic equilibrium, thereby forming an oxygenated bismuth cation, such as [—O—Bi—O—]+ (Eq. II) or [—O—Bi—OH]+ (Eq. III) and a hydroxide anion. The oxygenated bismuth cation and the hydroxide anion take part in the selective transport of the hydroxide anion through AAEM 100.

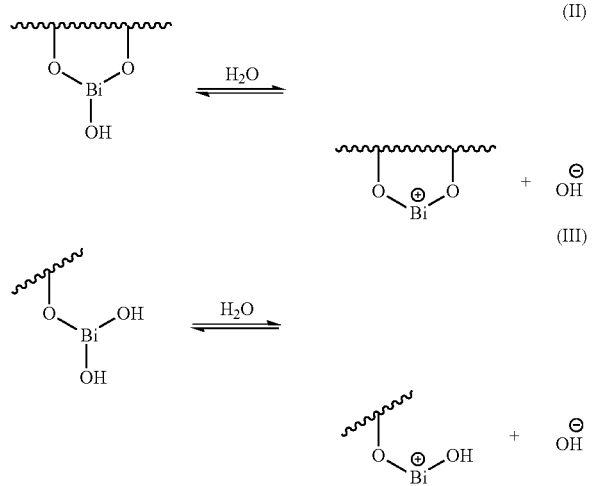

In the exemplary embodiments described below, bismuth forms stable covalent bonds with one or two oxygen atoms in the porous structural framework 102.

Figure 2:
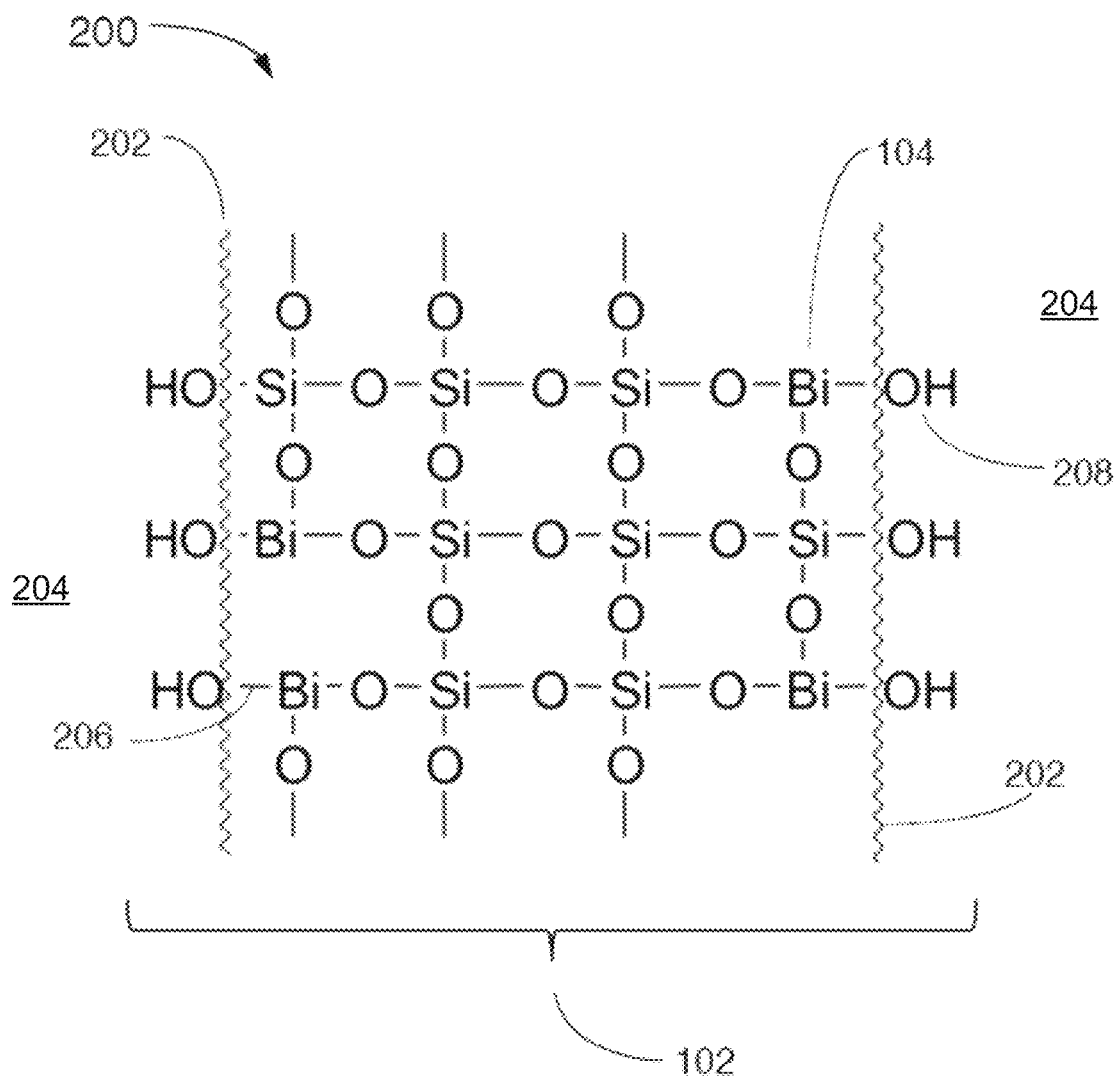
FIG. 2 shows an illustrative atomic arrangement 200 of an AAEM.

FIG. 2 shows in illustrative atomic arrangement 200 of AAEM 100 in which porous structural framework 102 is formed of silica glass with bismuth atoms 104 incorporated as an additive in the silica glass. While FIG. 2 shows silica glass, any other suitable type of glass may be used to form porous structural framework 102. Pore surfaces 202 are formed at the interface between porous structural framework 102 and an electrolyte 204 permeating AAEM 100. For illustration purposes only, a few atomic layers are shown between pore surfaces 202, but it is generally understood that any other number of atomic layers may be present between pore surfaces 202.

Bismuth atoms 104 are arranged at pore surfaces 202. As shown in FIG. 2, the bismuth atoms are incorporated in atomic arrangement 200 in the form of bismuth hydroxide, which may be represented by Eq. (II) above. In the illustrative atomic arrangement 200 shown in FIG. 2, the bismuth-oxygen bonds 206 at the pore surfaces 202 become hydrated forming hydroxyl (OH) groups 208, which are used for ion exchange. Pores in AAEM 100 provide means for permeation, allowing for hydration of the bismuth-oxygen bonds 206. It will be understood that the atomic layers between pore surfaces 202 may include both silica and bismuth atoms 104 in a wide range of ratios depending on the bismuth content of the glass, which may have a very wide range.

Figure 3A:
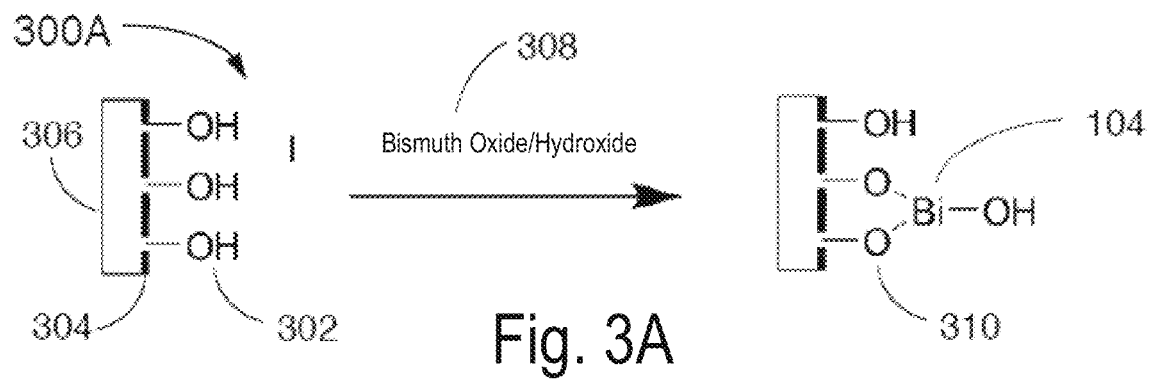
FIGS. 3A-3C show illustrative surface functionalization schemes for bonding bismuth atoms to one or two oxygen atoms on pore surfaces of a porous structural framework.
Figure 3B:
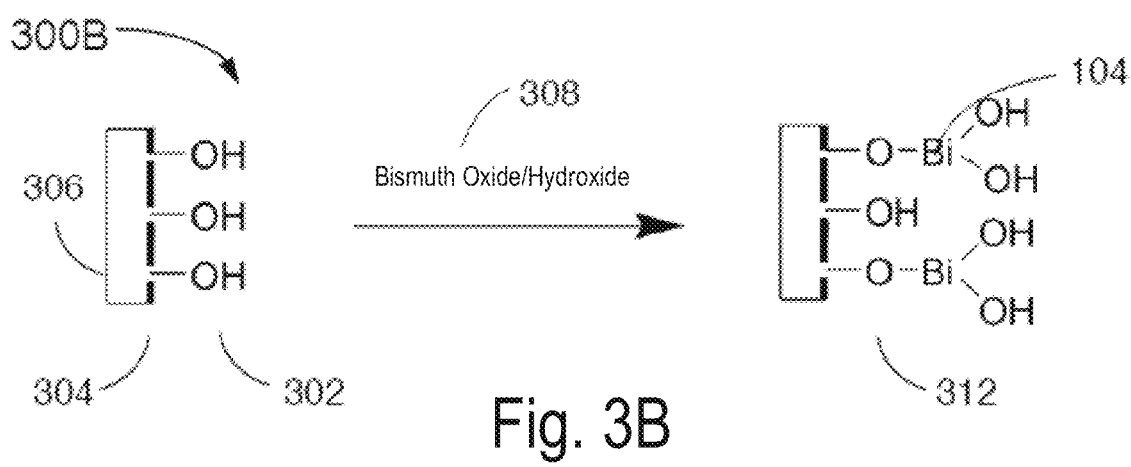
Figure 3C:
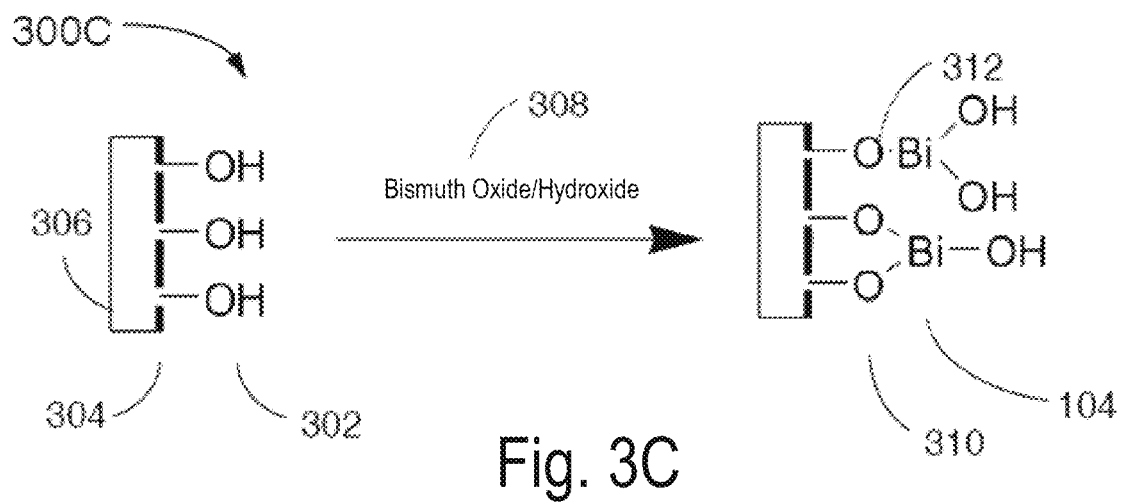

As shown in FIGS. 3A-3C, bismuth atoms 104 may be bonded to hydroxyl groups 302 present on pore surfaces 304 of a porous structural framework 306. Porous structural framework 306 may be formed of any porous or frit material that presents hydroxyl groups 302 on the pore surfaces 304. Porous structural framework 306 may be implemented by any porous structural framework described herein (e.g., porous structural framework 102).

Bismuth atoms 104 may be provided by bismuth hydroxide 308 ($Bi(OH)_3$), which may be formed when bismuth oxide is added to a reaction solution. Bismuth hydroxide 308 reacts with the hydroxyl groups 302 via a condensation dehydration reaction. As a result of this reaction, bismuth atoms 104 covalently bond each to two oxygen atoms 310 or to one oxygen atom 312, creating a water molecule per bismuth-oxygen bond.

FIG. 3A shows an illustrative surface functionalization scheme 300A wherein the bismuth atoms 104 each covalently bond to two oxygen atoms 310 on pore surfaces 304 of the porous structural framework 306.

FIG. 3B shows an illustrative surface functionalization scheme 300B wherein the bismuth atoms 104 each covalently bond to one oxygen atom 312 on the pore surfaces 304 of the porous structural framework 306.

FIG. 3C shows an illustrative surface functionalization scheme 300C wherein the bismuth atoms 104 each covalently bonded to two oxygen atoms 310 or to one oxygen atom 312 on the pore surfaces 304 of the porous structural framework 306.

Other surface functionalization schemes may be used for bonding bismuth atoms 104 to hydroxyl groups 302 present on the pore surfaces 304 of the porous structural framework 306.

Figure 4:
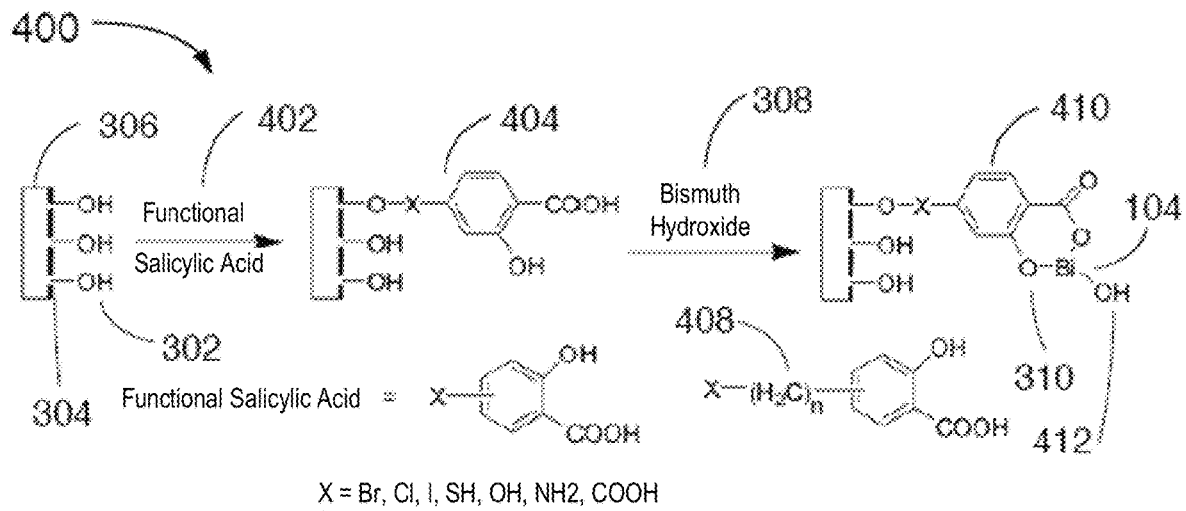
FIG. 4 shows an illustrative scheme for functionalizing pore surfaces of the porous structural framework with bismuth subsalicylate, which presents a bismuth-linked hydroxide available for anion exchange.

For example, FIG. 4 shows an illustrative surface functionalization scheme 400 for the porous structural framework 306 in a two-step reaction. The first step in the surface functionalization scheme 400 comprises reacting functional salicylic acid 402 to the hydroxyl groups 302 on the pore surfaces 304 of the porous structural framework 306, forming a salicylic acid modified surface 404.

The functional salicylic acid 402 may include a functional group X 406 and, optionally, a carbon spacer chain 408 of length n, where n may range from 1 to 20, for example. The functional group X 406 may be any group capable of reacting with the hydroxyl groups 302 on the pore surfaces 304 of the porous structural framework 306. Examples of the functional group X 406 include, without limitation, bromo, chloro, iodo, thiol, hydroxyl, amino, and carboxyl groups.

The second step of the surface functionalization scheme 400 comprises reacting bismuth hydroxide to the salicylic acid modified surface 404, thereby forming bismuth subsalicylate 410, which presents a bismuth-linked hydroxide 412 that is available for anion exchange.

One advantage of the bismuth subsalicylate 410 final configuration in the surface functionalization scheme 400 for the porous structural framework 306 is that the bismuth atoms 104 are covalently bonded to two oxygen atoms 310. The higher number of covalent bonds between the bismuth atoms 104 and oxygen atoms 310 increases the hydrophilicity of the porous structural framework 306.

Figure 5:
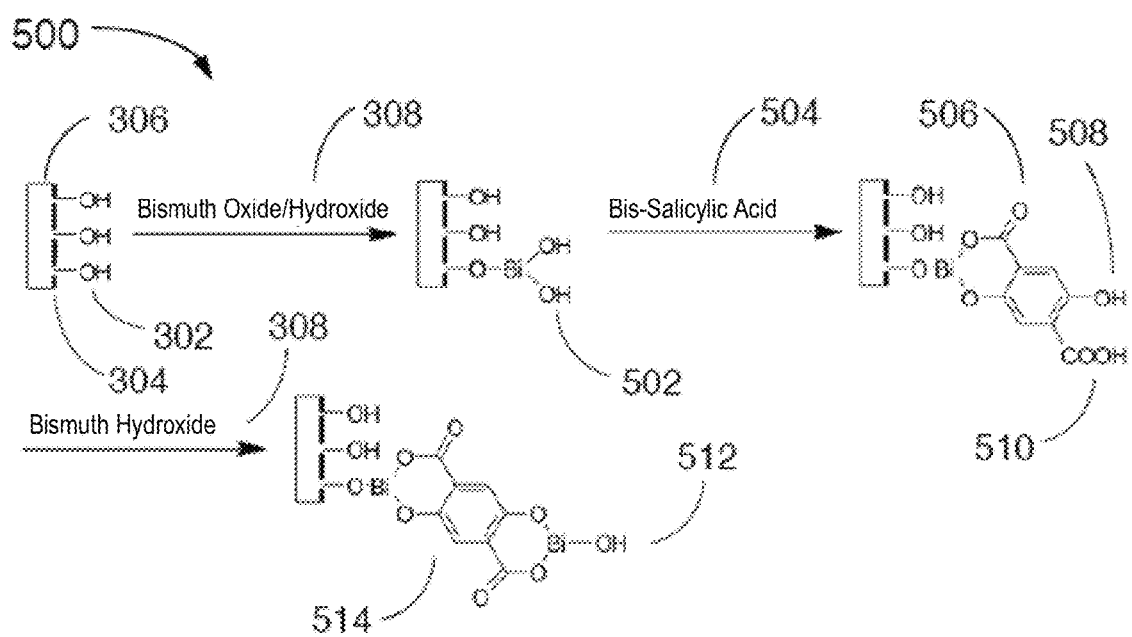
FIG. 5 shows an illustrative scheme for functionalizing pore surfaces of the porous structural framework with bis-bismuth subsalicylate, which presents a bismuth-linked hydroxide available for anion exchange.

Referring now to FIG. 5, herein is shown a second example of a surface functionalization scheme 500 for the porous structural framework 306 using a three-step reaction. The first step in the surface functionalization scheme 500 comprises reacting bismuth hydroxide 308 to the hydroxyl groups 302 on the pore surfaces 304 of the porous structural framework 306, thereby forming two bismuth-linked hydroxides 502.

The second step in the surface functionalization scheme 500 comprises reacting bis-salicylic acid 504 with the two bismuth-linked hydroxides 502, thereby creating a surface-linked bismuth-chelated salicylic acid 506, which presents a hydroxide group 508 and a carboxyl group 510.

The final step comprises reacting bismuth hydroxide 308 with the hydroxide group 508 and carboxyl group 510 of the surface-linked bismuth-chelated salicylic acid 506, which results in the incorporation of bismuth atoms 104 presenting a bismuth-linked hydroxide 512 that is available for anion exchange.

In summary, the surface functionalization scheme 500 for the porous structural framework 306 results in the formation of a bis-bismuth subsalicylate 514 with the bismuth-linked hydroxide 512 and several oxygen bismuth covalent bonds, with an added increase to the hydrophilicity of the porous structural framework 306.

In some embodiments, porous structural framework 306 may comprise synthetic organic polymers containing pendant hydroxyl motifs. FIGS. 6-9 show various examples of porous structural framework 306 generated using synthetic polymer resins.

Figure 6:
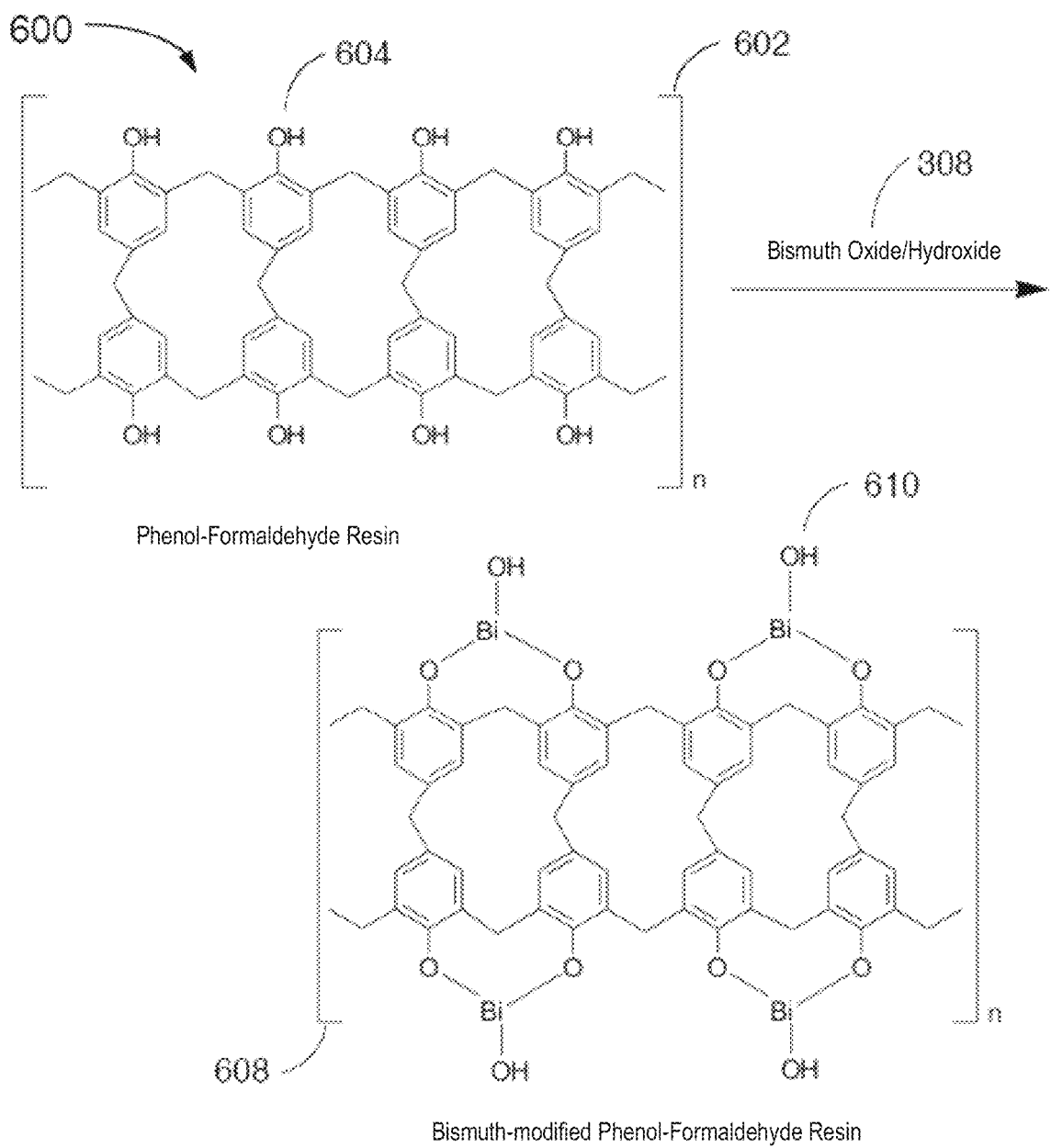
FIGS. 6-8 show illustrative surface functionalization schemes for porous structural framework created using formaldehyde resins.

FIG. 6 shows an illustrative surface functionalization scheme 600 for porous structural framework 306 created using a phenol-formaldehyde resin 602 with pendant hydroxyl groups 604. In a first step, the phenol-formaldehyde resin 602 may be repeated n times to form the porous structural framework 306, which presents pendant hydroxyl groups 604 at pore surfaces.

In a second step of the surface functionalization scheme 600, bismuth hydroxide 308 reacts with the pendant hydroxyl groups 604, creating a bismuth-modified phenol-formaldehyde resin with a bismuth-linked hydroxide 610 that is available for anion exchange.

Figure 7:
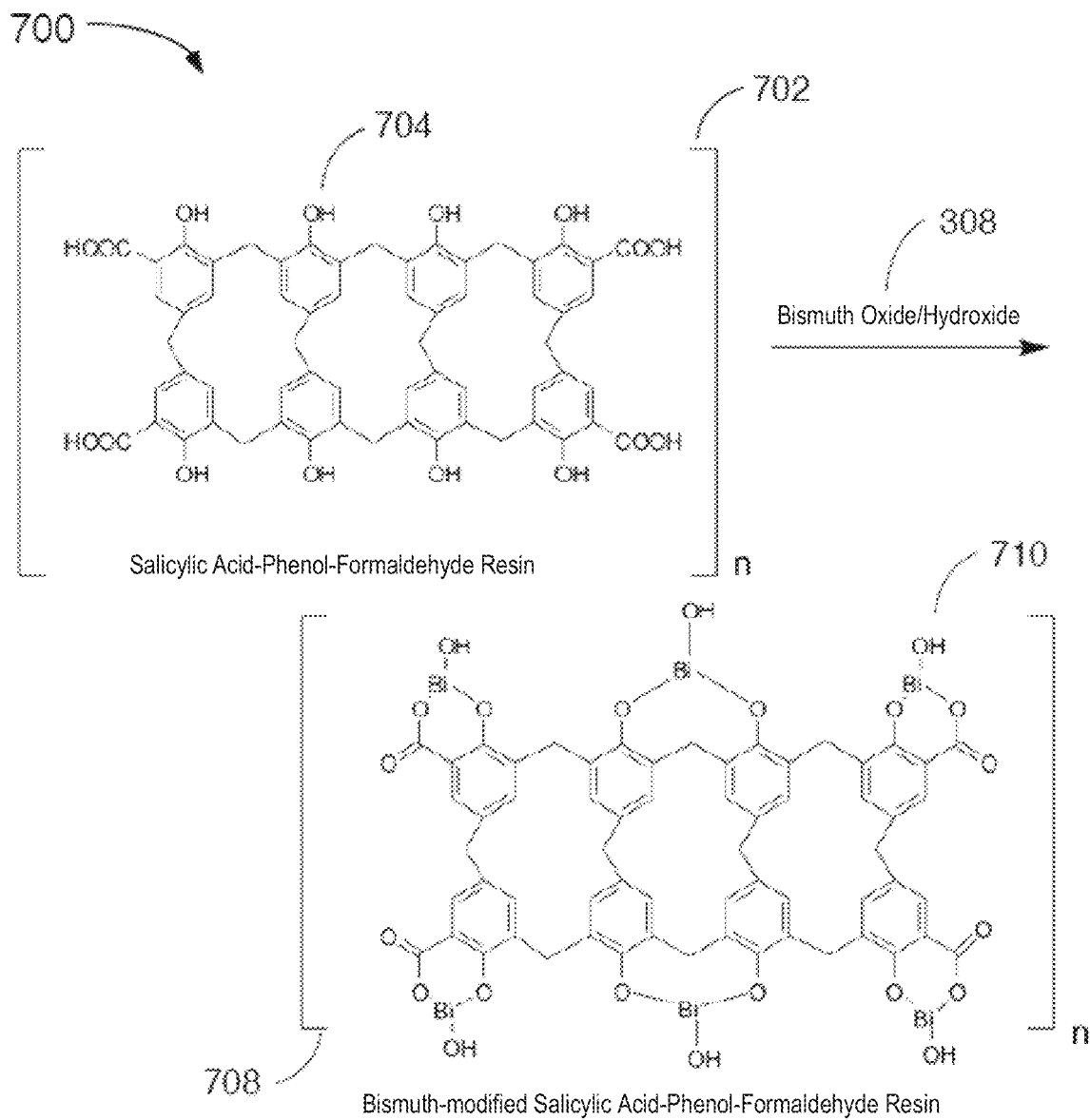

FIG. 7 shows an illustrative surface functionalization scheme 700 for the porous structural framework 306 created using salicylic-phenol-formaldehyde resin 702 with pendant hydroxyl groups 704. In a first step, the salicylic-phenol-formaldehyde resin 702 copolymer unit may be repeated n times to form the porous structural framework 306. The salicylic-phenol-formaldehyde resin 702 is a copolymer with salicylic acids combined with phenols.

In a second step of the surface functionalization scheme 700, bismuth hydroxide 308 reacts with the pendant hydroxyl groups 704, creating a bismuth-modified salicylic-phenol-formaldehyde resin 708 with a bismuth-linked hydroxide 710 that is available for anion exchange.

Figure 8:
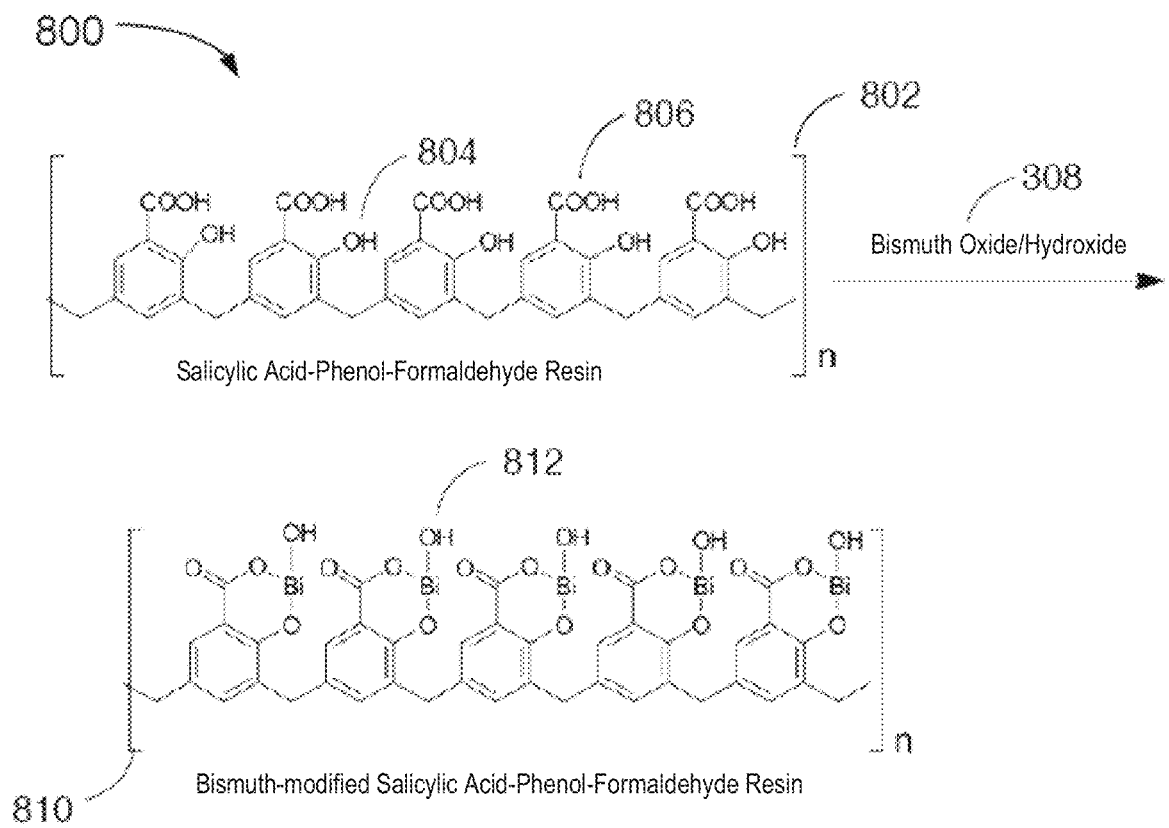

FIG. 8 shows an illustrative surface functionalization scheme 800 for a porous structural framework 306 created using salicylic acid-formaldehyde resin 802 with pendant hydroxyl groups 804 and pendant carboxyl groups 806. In a first step, the salicylic acid-formaldehyde resin 802 may be repeated n times 808 to form the porous structural framework 306.

In a second step of the surface functionalization scheme 800, bismuth hydroxide 308 reacts with the pendant hydroxyl groups 804 and the pendant carboxyl groups 806, creating a bismuth-modified salicylic acid-formaldehyde resin 810 with a bismuth-linked hydroxide 812 that is available for anion exchange.

Figure 9:
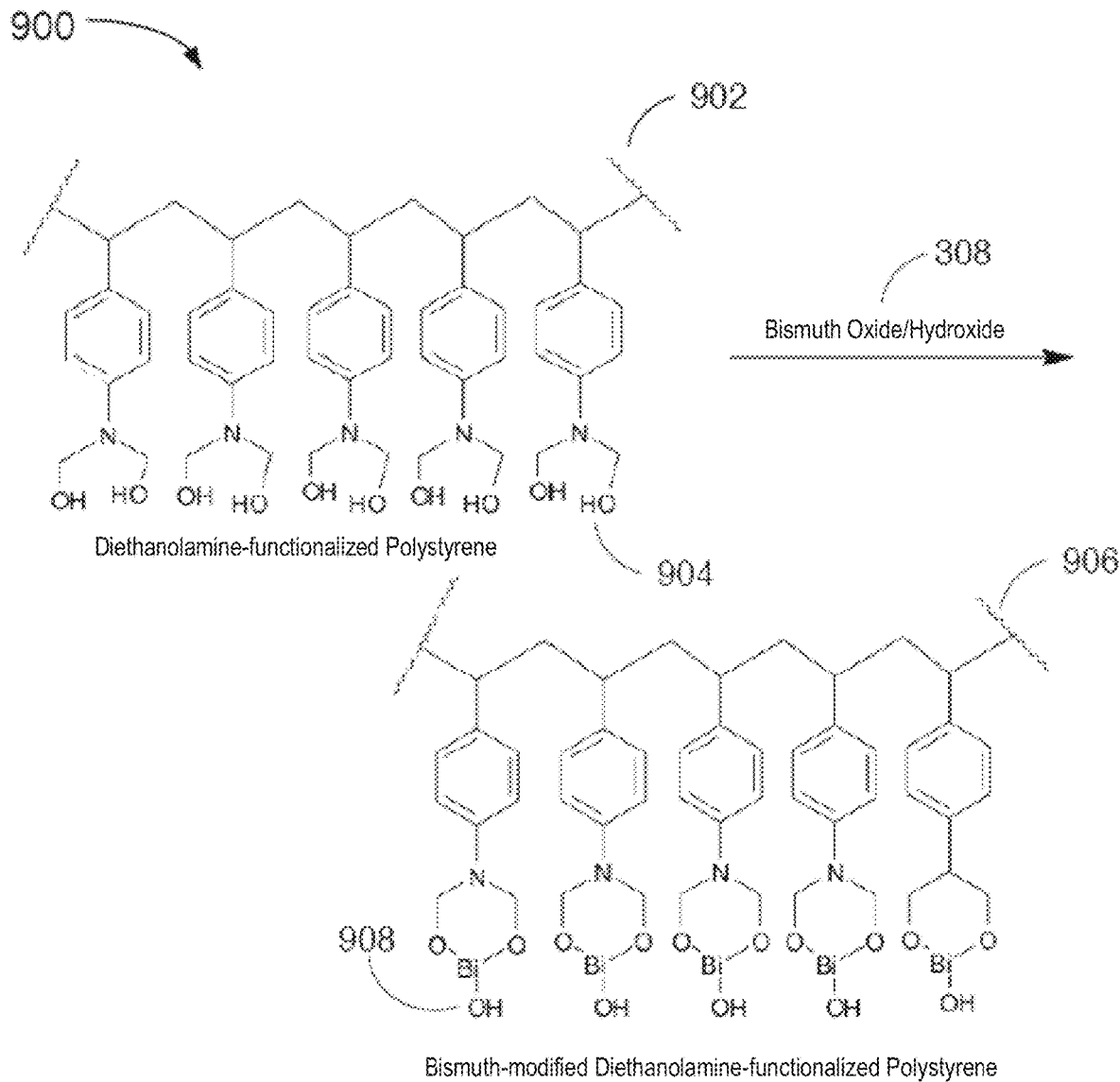
FIG. 9 shows an illustrative surface functionalization scheme for a porous structural framework created using a diethanolamine-functionalized polystyrene resin.

FIG. 9 shows an illustrative surface functionalization scheme 900 for a porous structural framework 306 created using diethanolamine-functionalized polystyrene resin 902 with pendant hydroxyl groups 904. In a first step, the diethanolamine-functionalized polystyrene resin 902 may be repeated a number of times to form the porous structural framework 306.

In a second step of the surface functionalization scheme 900, bismuth hydroxide 308 reacts with the pendant hydroxyl groups 904, creating a bismuth-modified diethanolamine-functionalized polystyrene resin 906 with a bismuth-linked hydroxide 908 that is available for anion exchange.

Figure 10:
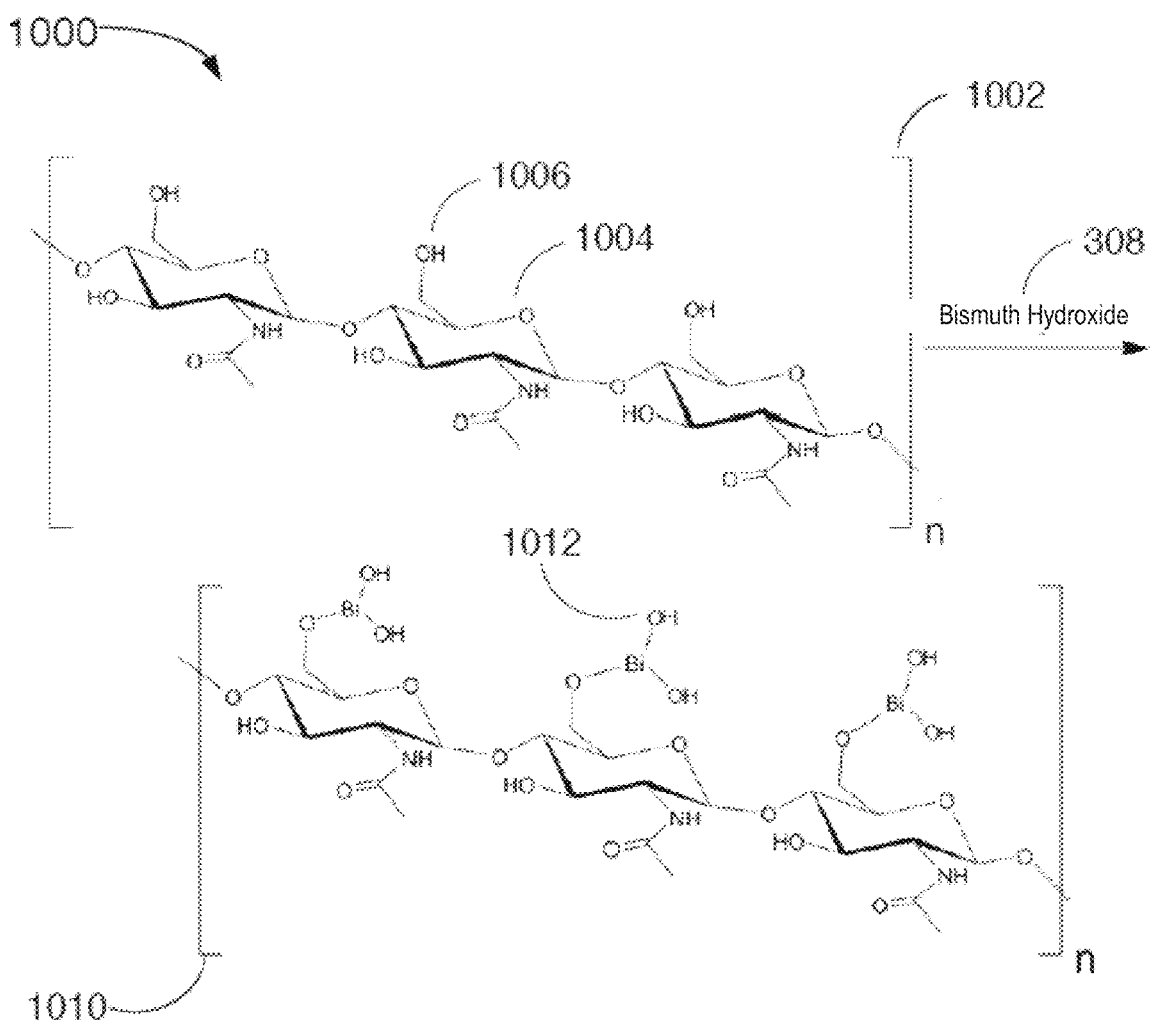
FIGS. 10-12 show illustrative surface functionalization schemes for a porous structural framework created using naturally occurring organic polymers.
Figure 11:
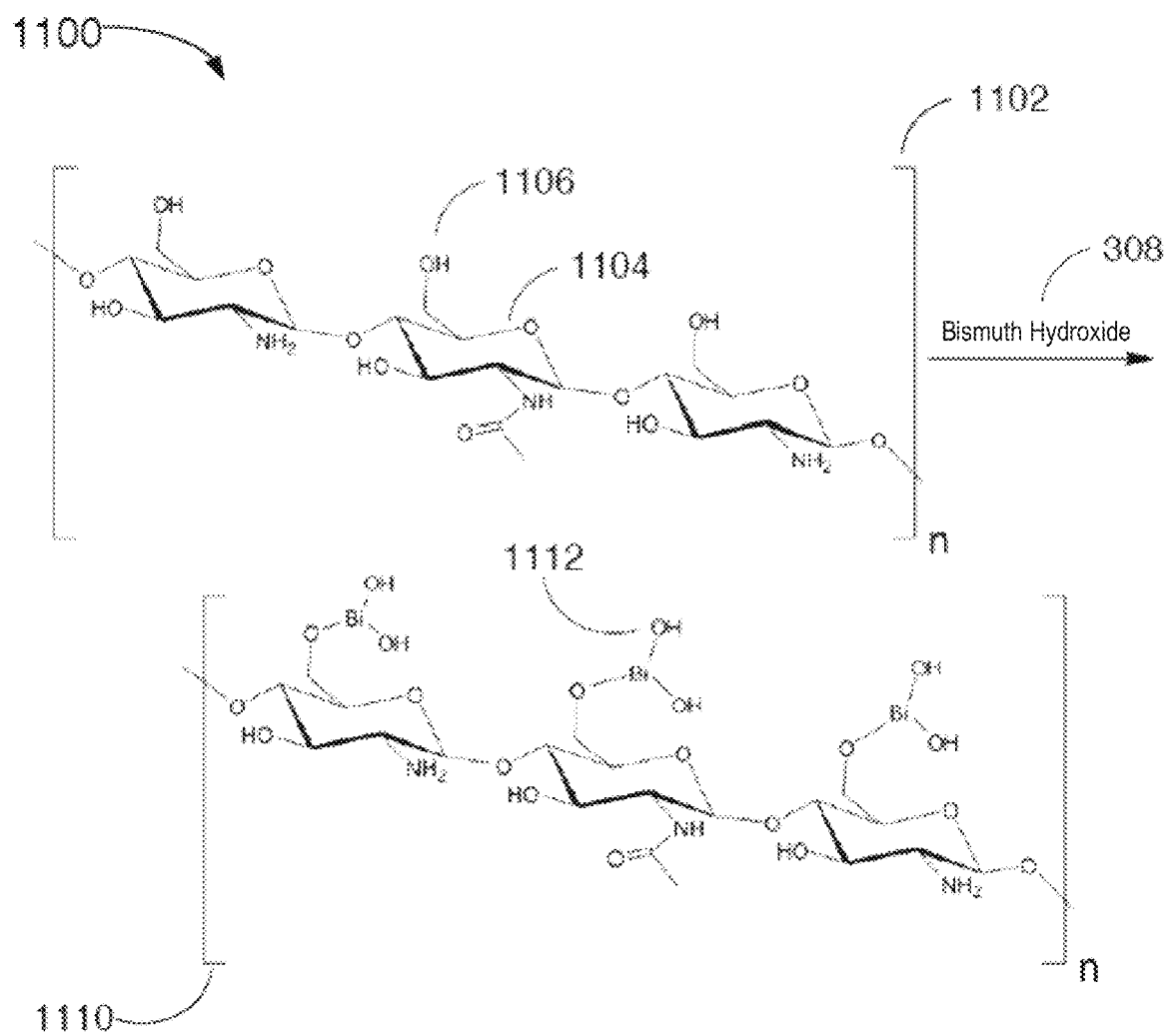
Figure 12:
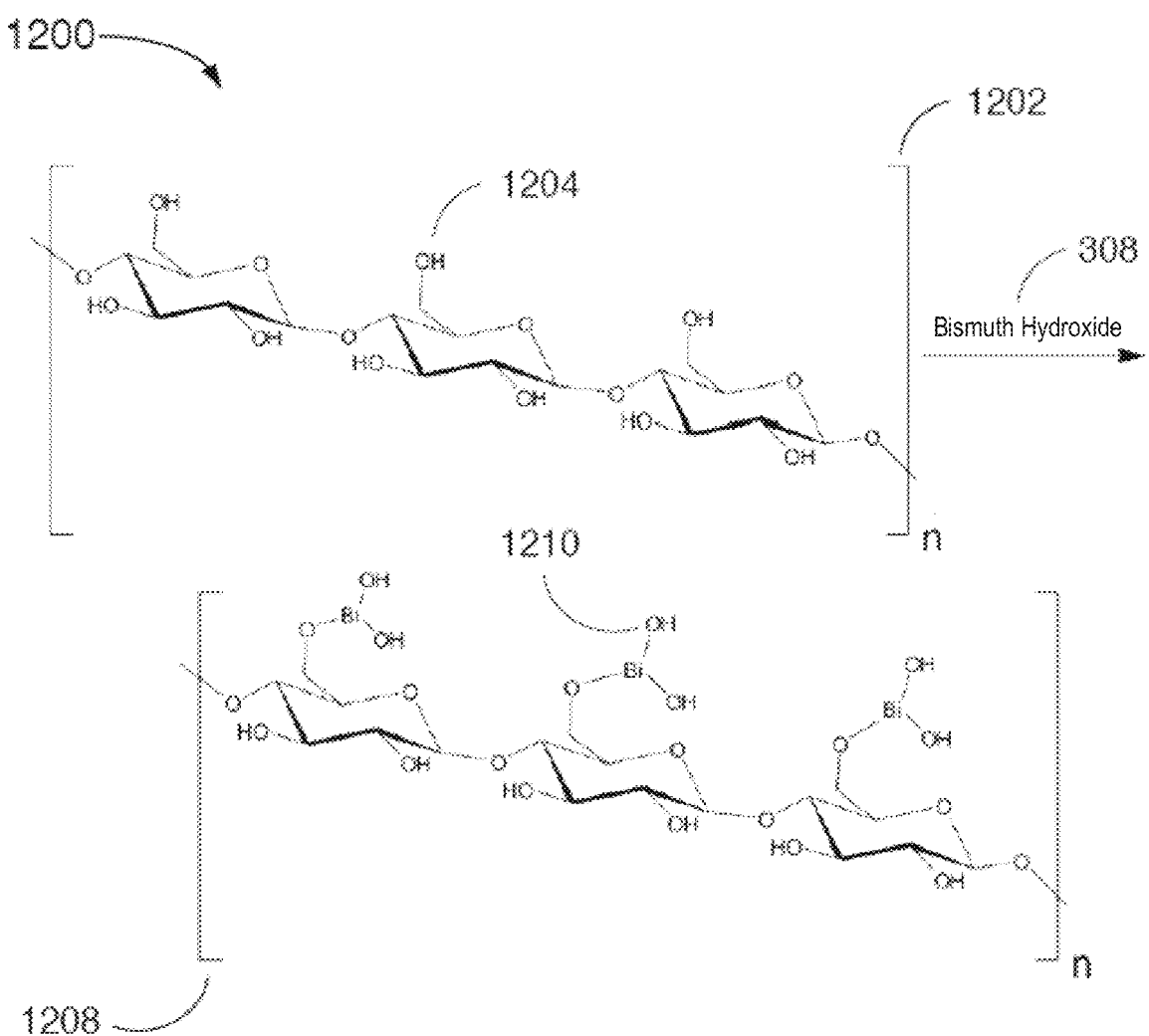

In yet other illustrative embodiments, porous structural framework 306 may be created using natural organic polymers containing pendant hydroxyl groups. FIGS. 10-12 show examples of the porous structural framework 102 generated using naturally occurring polysaccharides or partially modified naturally occurring polysaccharides.

FIG. 10 shows an illustrative surface functionalization scheme 1000 for a porous structural framework 306 created using chitin 1002, a linear polysaccharide containing N-acetyl glucosamine monomers 1004 with pendant hydroxyl groups 1006. In a first step, the chitin 1002 may be repeated n times to form the porous structural framework 306. Chitin 1002 is a naturally occurring polymer.

In a second step of the surface functionalization scheme 1000, bismuth hydroxide 308 reacts with the pendant hydroxyl groups 1006, creating a bismuth-modified chitin 1010 with a bismuth-linked hydroxide 1012 that is available for anion exchange.

FIG. 11 shows an illustrative surface functionalization scheme 1100 for a porous structural framework 306 created using chitosan 1102, a linear polysaccharide containing randomly distributed glucosamine and N-acetyl glucosamine monomers 1104 with pendant hydroxyl groups 1106. In a first step, chitosan 1102 is partially modified by randomly hydrolyzing the N-acetyl glucosamine motif, and the chitosan 1102 may be repeated n times to form the porous structural framework 306.

In a second step of the surface functionalization scheme 1100, bismuth hydroxide 308 reacts with the pendant hydroxyl groups 1106, creating a bismuth-modified chitosan 1110 with a bismuth-linked hydroxide 1112 that is available for anion exchange.

FIG. 12 shows an illustrative surface functionalization scheme 1200 for a porous structural framework 306 created using cellulose 1202 with pendant hydroxyl groups 1204. Cellulose 1202 is a naturally occurring linear chain polysaccharide containing hundreds to thousands of glucose monomers. In a first step, the cellulose 1202 may be repeated n times to form the porous structural framework 306.

In a second step of the surface functionalization scheme 1200, bismuth hydroxide 308 reacts with the pendant hydroxyl groups 1204, creating a bismuth-modified cellulose 1208 with a bismuth-linked hydroxide 1210 that is available for anion exchange.

Figure 13A:
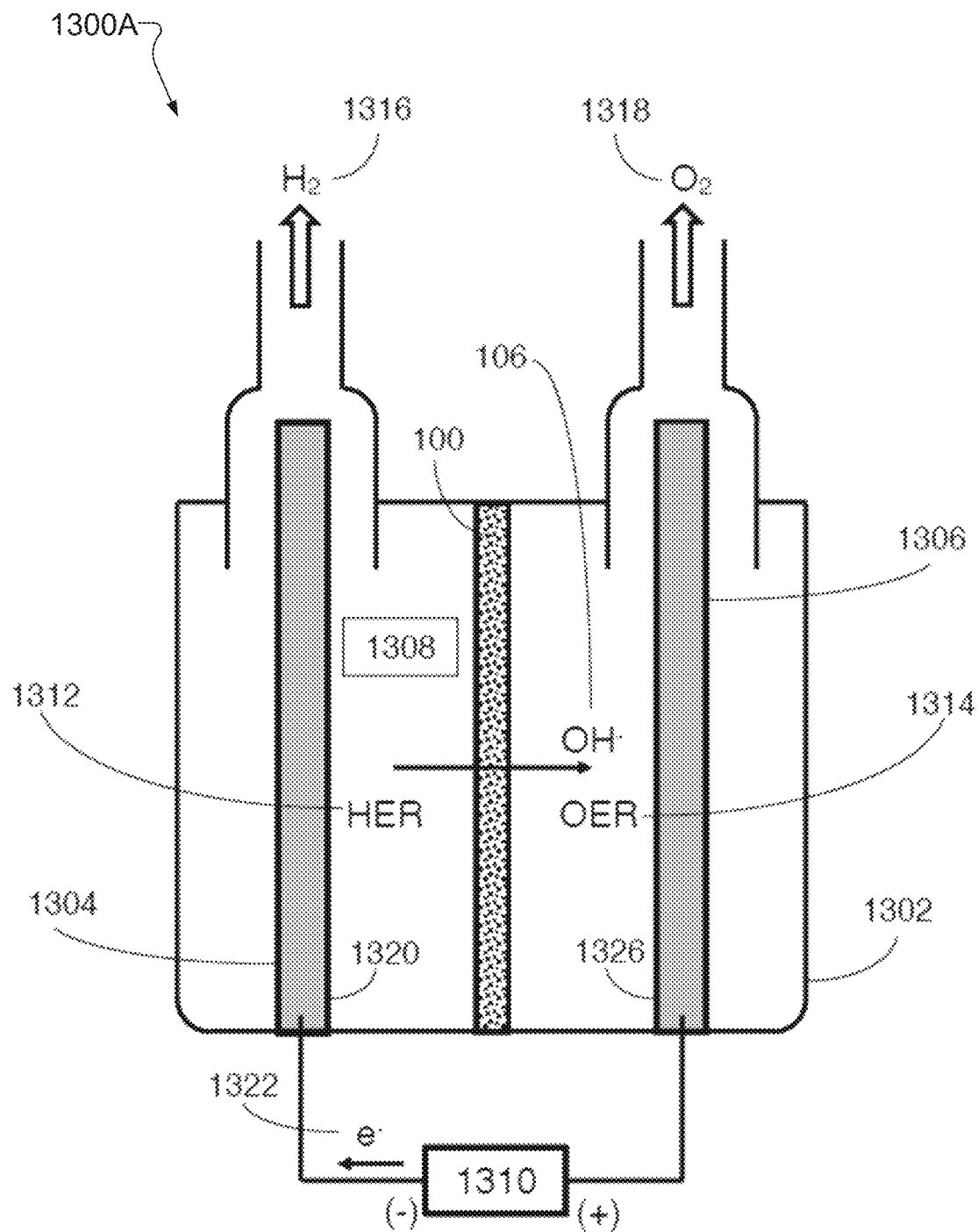
FIG. 13A shows a schematic diagram of an illustrative alkaline electrolyzer incorporating an alkaline anion exchange membrane.

FIG. 13A shows a schematic diagram of an illustrative alkaline electrolyzer 1300A incorporating AAEM 100. The alkaline electrolyzer 1300A includes a vessel 1302 containing a cathode 1304 and an anode 1306, both partially or completely immersed in an alkaline electrolyte 1308. The cathode 1304 and anode 1306 are separated by AAEM 100, which is also partially immersed in the alkaline electrolyte 1308. When the alkaline electrolyzer 1300A is connected to a power supply 1310, a hydrogen evolution reaction 1312 (HER) occurs at the cathode 1304 and an oxygen evolution reaction 1314 (OER) happens at the anode 1306. The hydrogen evolution reaction 1312 (HER) and the oxygen evolution reaction 1314 (OER) are two complementary electrochemical reactions for splitting water by electrolysis. AAEM 100 is a porous support that separates the reaction gases, hydrogen gas ($H_2$) 1316 and oxygen gas ($O_2$) 1318. AAEM 100 may be implemented by any of the alkaline anion exchange membranes described herein.

The hydrogen evolution reaction 1312 (HER) at the cathodic electrode-electrolyte interface 1320 at the cathode 1304 is represented by the following electrochemical half-reaction (Equation (IVa)):

$$4H_2O + 4e^- \rightarrow 2H_2 + 4OH^- \tag{IVa}$$

where $H_2O$ is a water molecule, $e^-$ is an electron 1322, $H_2$ is hydrogen gas 1316, and $OH^-$ is the hydroxide anion 106. The oxygen evolution reaction 1314 (OER) at the anodic electrode-electrolyte interface 1326 at the anode 1306 is represented by the following electrochemical half-reaction (Equation (IVb)):

$$4OH^- \rightarrow O_2 + 2H_2O + 4e^- \tag{IVb}$$

where $H_2O$ is a water molecule, $e^-$ is an electron 1322, $O_2$ is oxygen gas 1318, and $OH^-$ is the hydroxide anion 106. Thus, the overall electrolysis reaction is given by the following Equation (IV):

$$2H_2O \rightarrow 2H_2 + O_2 \tag{IV}$$

Therefore, the anion exchange membrane 100 allows for the transport of the hydroxide anion 106 from the cathode 1304 to the anode 1306.

The configuration of alkaline electrolyzer 1300A shown and described with respect to FIG. 13A is merely illustrative and not limiting, as other suitable configurations as well as other suitable fuel electrolyzers may be used that incorporate AAEM 100.

Figure 13B:
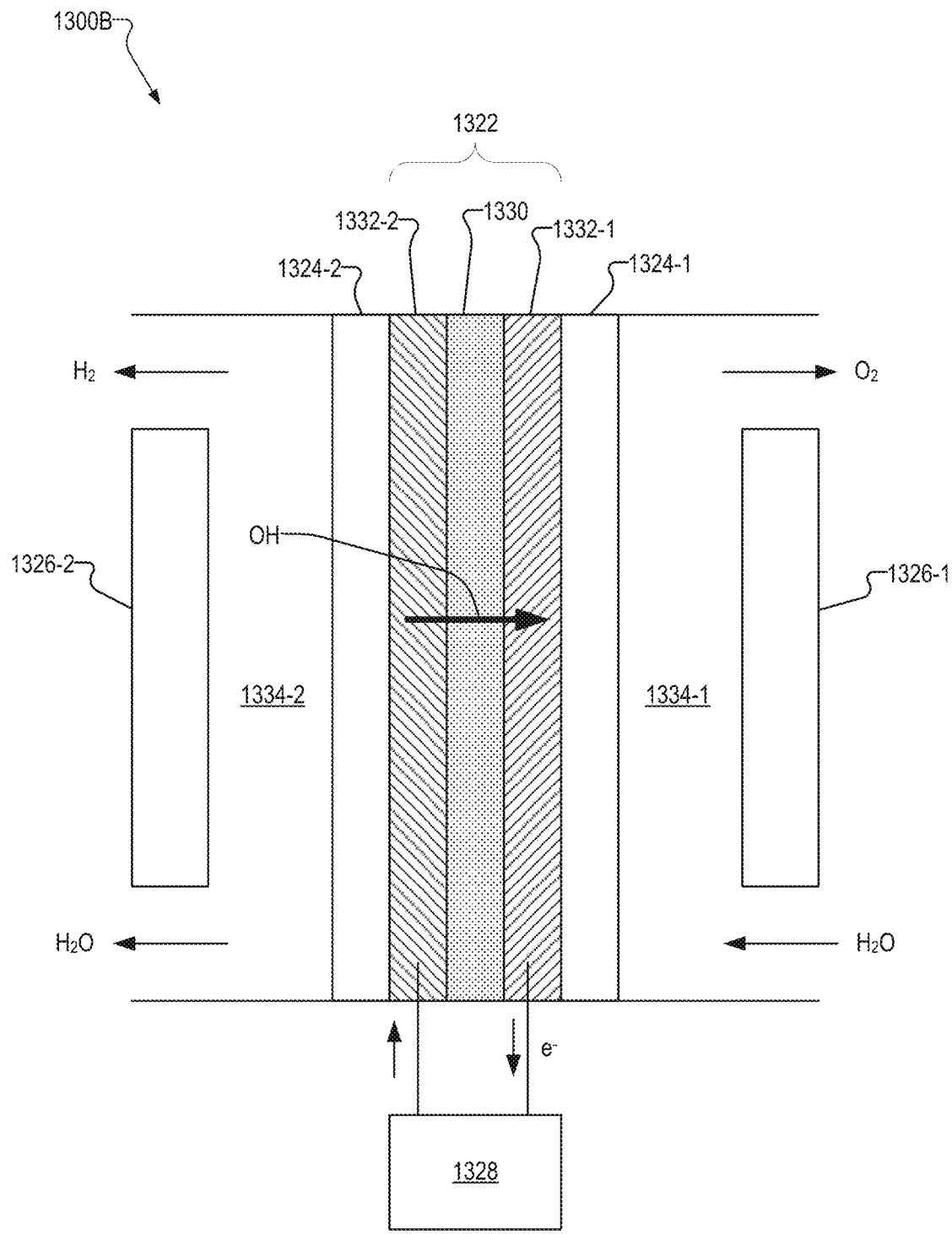
FIG. 13B shows a schematic diagram of an illustrative alkaline membrane electrolyzer incorporating an alkaline anion exchange membrane.

FIG. 13B shows a schematic diagram of an illustrative alkaline membrane electrolyzer 1300B (AME 1300B) incorporating an AAEM (e.g., AAEM 100). AME 1300B is an alkaline membrane water electrolysis system configured to split water by electrolysis to produce hydrogen gas ($H_2$) and oxygen gas ($O_2$) in a manner similar to alkaline electrolyzer 1300A. As shown in FIG. 13B, AME 1300B includes a catalyst-coated membrane 1322 (CCM 1322), porous transport layers 1324-1 and 1324-2, bipolar plates 1326-1 and 1326-2, and an electrical power supply 1328. CCM 1322, porous transport layers 1324-1 and 1324-2, and bipolar plates 1326-1 and 1326-2 together form a water electrolysis cell. AME 1300B may also include additional or alternative components not shown in FIG. 13B as may serve a particular implementation.

CCM 1322 includes an AAEM 1330 and a first catalyst layer 1332-1 and a second catalyst layer 1332-2 positioned (e.g., coated) on both sides of AAEM 1330. AAEM 1330 electrically isolates first catalyst layer 1332-1 from second catalyst layer 1332-2 while providing selective conductivity of anions, such as hydroxide anions ($OH^-$), and while being impermeable to gases such as hydrogen and oxygen. AAEM 1330 may be implemented by any suitable AAEM. For example, AAEM 1330 may be implemented by a bismuth-containing porous membrane comprising a porous structural framework with bismuth atoms bonded to pore surfaces within the porous structural framework. AAEM may be implemented by any AAEM described herein (e.g., AAEM 100).

First catalyst layer 1332-1 and second catalyst layer 1332-2 are electrically conductive electrodes with embedded electrochemical catalysts (not shown). In some examples, first catalyst layer 1332-1 and second catalyst layer 1332-2 may be formed using a low molecular weight ionomer to bind catalyst nanoparticles. In some examples, the ionomer used to form first catalyst layer 1332-1 and/or second catalyst layer 1332-2 may include bismuth atoms and may be formulated in any way described herein, such as any of the schemes described in FIGS. 6-12.

CCM 1322 is placed between porous transport layers 1324-1 and 1324-2, which are in turn placed between bipolar plates 1326-1 and 1326-2 with flow channels 1334-1 and 1334-2 located in between bipolar plates 1326 and porous transport layers 1324.

In CCM 1322, first catalyst layer 1332-1 (alone or in combination with porous transport layer 1324-1 and/or bipolar plate 1326-1) functions as an anode and second catalyst layer 1332-2 (alone or in combination with porous transport layer 1324-2 and/or bipolar plate 1326-2) functions as a cathode. When AEM 1300B is powered by power supply 1328, the hydrogen evolution reaction (HER) occurs at cathode 1332-2, represented by the electrochemical half-reaction given by Eq. (IVa). Hydroxide ions are conducted from cathode 1332-2 to anode 1332-1 through AAEM 1330, and electrons are conducted from anode 1332-1 to cathode 1332-2 by a conductive path around AAEM 1330. AAEM 1330 allows for the transport of hydroxide ions ($OH^-$) and water from the cathode 1332-2 to the anode 1332-1 but is impermeable to oxygen and hydrogen. The oxygen evolution reaction (OER) occurs at anode 1332-1, represented by the electrochemical half-reaction given by Eq. (IVb). Thus, AME 1300B carries out the overall electrolysis reaction given by Eq. (IV).

Figure 14:
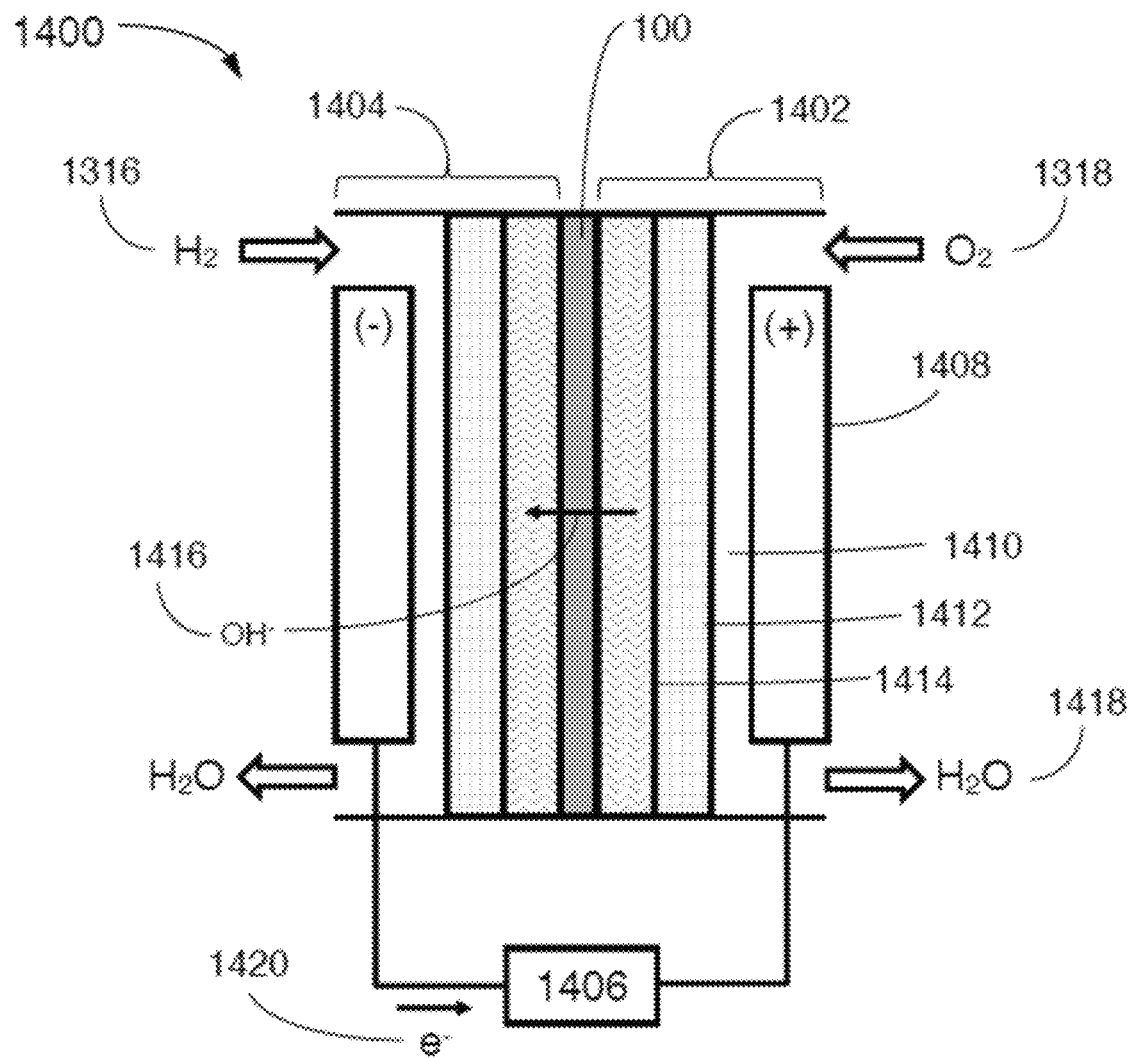
FIG. 14 shows a schematic diagram of an illustrative anion exchange membrane fuel cell incorporating an alkaline anion exchange membrane.

FIG. 14 shows a schematic diagram of an illustrative anion exchange membrane fuel cell 1400 incorporating AAEM 100. The anion exchange membrane fuel cell 1400 produces electricity as a result of electrochemical reactions. In this example, the electrochemical reaction involves reacting hydrogen gas 1316 and oxygen gas 1318. AAEM 100 is sandwiched between a cathode 1402 and an anode 1404. AAEM 100 may be implemented by any of the alkaline anion exchange membranes described herein. The cathode 1402 and the anode 1404 are electrically connected to a load 1406. Electricity generated by the anion exchange membrane fuel cell 1400 drives the load 1406.

The cathode 1402 is an electrically interconnected assembly that includes a bipolar plate 1408 with a flow passage 1410. Oxygen gas 1318 flows into the flow passage 1410. The rest of the cathode 1402 includes a gas diffusion layer 1412 and a catalyst layer 1414. In some examples, the combined stack of AAEM 100 and catalyst layers 1414 (and optionally also gas diffusion layers 1412 and/or bipolar plates 1408) form a membrane electrode assembly.

The anode 1404, similarly to the cathode 1402, is an electrically interconnected assembly that includes a bipolar plate with a flow passage. Hydrogen gas 1316 flows into the flow passage. The rest of the anode 1404 includes a gas diffusion layer and a catalyst layer. Numbering for the elements in the anode 1404 are not shown in FIG. 14 for simplicity, due to the similarity with the components of the cathode 1402.

In the anion exchange membrane fuel cell 1400, the hydroxide anion 1416 is generated at the cathode 1402 according to an oxygen reduction reaction (ORR) given by the following Equation (Va):

$$O_2 + 2H_2O + 4e^- \rightarrow 4OH^- \tag{Va}$$

The hydroxide anion 1416 is transported through AAEM 100 to the anode 1404 where the hydrogen oxidation reaction (HOR) takes place, given by the following Equation (Vb):

$$4OH^- + 2H_2 \rightarrow 4H_2O + 4e- \tag{Vb}$$

Thus the overall reaction for the anion exchange membrane fuel cell 1400 is given by the following Equation (V):

$$2H_2 + O_2 \rightarrow 2H_2O \tag{V}$$

In the overall reaction, the anion exchange membrane fuel cell produces water 1418 at the anode 1404, and water 1418 is also a reactant at the cathode 1402. Water 1418 may flow from the anode 1404 to the cathode 1402 and is also a reaction product that is removed through the outlet of flow passage 1410. The overall reaction generates electrons 1420 that drive load 1406.

The configuration of anion exchange membrane fuel cell 1400 shown and described with respect to FIG. 14 is merely illustrative and not limiting, as other suitable configurations as well as other suitable fuel cells may be used that incorporate AAEM 100.

The various embodiments described herein may offer many benefits and advantages over conventional art. For example, bismuth-based acid groups are highly ionizable, so there is no need for membrane pre-conditioning. Bismuth also offers flexibility in terms of the use of porous structural framework materials, as many different inorganic and/or organic materials may be used. Furthermore, the hydrophilicity of the porous structural framework can be tailored depending on the application (e.g., water electrolysis vs fuel cells where there is a need to reduce water flooding at the anode (O₂) side).

Furthermore, water electrolysis systems and fuel cells described herein may operate at high current densities (e.g., 2.0 A/cm2). Conventional systems operate at current densities below 1.0 A/cm2. Moreover, the systems and apparatuses described herein may have increased durability (e.g., durability exceeding 20,000 hours of operation and, in some examples, exceeding 60,000 hours of operation) at high current densities (1.0-2.0 A/cm2).

The systems and apparatuses described herein may also be used at higher temperatures, such as temperatures from 80° C. to 200° C. or higher, getting into the realm of "high-temperature electrolysis" (provided that the AAEM stays hydrated, maintaining its hydroxide ion conductivity). For water electrolysis systems, operation at higher temperatures reduces activation energy, potentially increasing system efficiency (provided the AAEM remains hydrated to preserve or increase its hydroxide ion conductivity). Fuel cell operation at higher temperatures (e.g., 90 to 120° C. or higher) make the system more compatible with automotive applications and may also help in reducing water flooding.

In the preceding description, various exemplary embodiments have been described with reference to the accompanying drawings. It will, however, be evident that various modifications and changes may be made thereto, and additional embodiments may be implemented, without departing from the scope of the claims that follow. For example, certain features of one embodiment described herein may be combined with or substituted for features of another embodiment described herein. The description and drawings are accordingly to be regarded in an illustrative rather than a restrictive sense.

What is claimed is:

1. An anion exchange membrane comprising:
   a porous structural framework; and
   bismuth atoms bonded to pore surfaces of the porous structural framework;
   wherein each bismuth atom is bonded to a pore surface by way of one or two oxygen atoms.

2. The anion exchange membrane of claim 1, wherein each bismuth atom is further bonded to a hydroxyl group or a hydroxide anion.

3. The anion exchange membrane of claim 1, wherein each bismuth atom and the one or two oxygen atoms are included in a bismuth subsalicylate group linked to the pore surface.

4. The anion exchange membrane of claim 3, wherein each bismuth subsalicylate group is linked to the pore surface by way of a bromo group, a chloro group, an iodo group, a thiol group, a hydroxyl group, an amino group, or a carboxyl group.

5. The anion exchange membrane of claim 4, wherein each bismuth subsalicylate group is further linked to the pore surface by way of an alkyl spacer chain of length n, where n ranges from 1 to 20.

6. The anion exchange membrane of claim 1, wherein each bismuth atom and the one or two oxygen atoms are included in a bis-bismuth subsalicylate group linked to the pore surface.

7. The anion exchange membrane of claim 6, wherein the bis-bismuth subsalicylate group is linked to the pore surface by way of a bismuth-oxygen bond.

8. The anion exchange membrane of claim 1, wherein the porous structural framework comprises glass.

9. The anion exchange membrane of claim 1, wherein the porous structural framework comprises a formaldehyde resin.

10. The anion exchange membrane of claim 9, wherein the formaldehyde resin comprises a phenol-formaldehyde resin, a salicylic-phenol-formaldehyde resin, or a salicylic acid-formaldehyde resin.

11. The anion exchange membrane of claim 1, wherein the porous structural framework comprises a diethanolamine-functionalized polystyrene resin.

12. The anion exchange membrane of claim 1, wherein the porous structural framework comprises chitin, chitosan, or cellulose.

13. A method of making an anion exchange membrane, comprising:
   bonding bismuth atoms to pore surfaces of a porous structural framework by way of one or two oxygen atoms.

14. The method of claim 13, wherein the bonding comprises reacting bismuth hydroxide with hydroxyl groups present at the pore surfaces.

15. The method of claim 14, further comprising functionalizing the pore surfaces with the hydroxyl groups.

16. The method of claim 15, wherein the functionalizing the pore surfaces with the hydroxyl groups comprises reacting functional salicylic acid with hydroxyl groups of the porous structural framework by way of a bromo group, a chloro group, an iodo group, a thiol group, a hydroxyl group, an amino group, or a carboxyl group.

17. The method of claim 15, wherein the functionalizing the pore surfaces with the hydroxyl groups comprises: reacting bismuth hydroxide with hydroxyl groups of the porous structural framework to form two bismuth-linked hydroxyl groups; and reacting bis-salicylic acid with the two bismuth-linked hydroxyl groups.

18. The method of claim 13, wherein the porous structural framework comprises a formaldehyde resin with pendant hydroxyl groups at the pore surfaces.

19. The method of claim 18, wherein the formaldehyde resin comprises a phenol-formaldehyde resin, a salicylic-phenol-formaldehyde resin, or a salicylic acid-formaldehyde resin.

20. The method of claim 13, wherein the porous structural framework comprises a diethanolamine-functionalized polystyrene resin with pendant hydroxyl groups at the pore surfaces.

21. The method of claim 13, wherein the porous structural framework comprises chitin, chitosan, or cellulose with pendant hydroxyl groups at the pore surfaces.

22. An apparatus comprising:
an anode;
a cathode; and
an alkaline anion exchange membrane positioned between the cathode and the anode, the anion exchange membrane comprising a porous structural framework and a bismuth atom bonded to a pore surface of the porous structural framework by way of one or two oxygen atoms.

23. The apparatus of claim 22, wherein:
the anode comprises a first catalyst layer coated on a first side of the alkaline anion exchange membrane;
the cathode comprises a second catalyst layer coated on a second side of the alkaline anion exchange membrane; and
at least one of the first catalyst layer and the second catalyst layer comprises an ionomer including bismuth and embedded catalysts.

24. The apparatus of claim 22, wherein the bismuth atom and the one or two oxygen atoms are included in a bismuth subsalicylate group linked to the pore surface.

25. The apparatus of claim 22, wherein the bismuth atom and the one or two oxygen atoms are included in a bis-bismuth subsalicylate group linked to the pore surface.

26. The apparatus of claim 22, wherein the porous structural framework comprises glass or a formaldehyde resin.

27. The apparatus of claim 23, wherein the porous structural framework comprises a diethanolamine-functionalized polystyrene resin.

28. The apparatus of claim 22, wherein the porous structural framework comprises chitin, chitosan, or cellulose.

29. The apparatus of claim 22, wherein the pore surface of the porous structural framework is functionalized with a bismuth subsalicylate derivative including the bismuth atom, the one or two oxygen atoms, and a pendant hydroxide group linked to the bismuth atom.

30. The apparatus of claim 22, wherein the pore surface of the porous structural framework is functionalized with bismuth hydroxide.

\* \* \* \* \*